US008982410B2

(12) United States Patent
Narita (10) Patent No.: US 8,982,410 B2
(45) Date of Patent: Mar. 17, 2015

(54) PRINTING CONTROL METHOD, PRINTING CONTROL APPARATUS, AND COMPUTER-READABLE RECORDING MEDIUM FOR SETTING A BINDING MARGIN ACCORDING TO A BINDING DIRECTION (75) Inventor: Hirofumi Narita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 12/748,033

(22) Filed: Mar. 26, 2010

(65) Prior Publication Data
US 2010/0245872 A1 Sep. 30, 2010

(30) Foreign Application Priority Data
Mar. 3, 2009 (JP) .................. 2009-082084

(51) Int. Cl.
H04N 1/60 (2006.01)
H04N 1/387 (2006.01)
H04N 1/00 (2006.01)

(52) U.S. Cl.
CPC ........... H04N 1/387 (2013.01); H04N 1/00413 (2013.01); H04N 1/00421 (2013.01); H04N 1/00442 (2013.01); H04N 1/00456 (2013.01); H04N 1/00466 (2013.01); H04N 2201/0082 (2013.01)
USPC ........................... 358/1.9; 358/1.15; 358/1.18

(58) Field of Classification Search
None
See application file for complete search history.

(56) References Cited

U.S. PATENT DOCUMENTS

| | | | |
|---|---|---|---|
| 5,960,229 A * | 9/1999 | Fukuoka et al. ............... 399/17 |
| 6,417,931 B2 * | 7/2002 | Mori et al. .................. 358/1.15 |
| 7,180,608 B1 * | 2/2007 | Yu ................................. 358/1.1 |
| 7,319,539 B2 * | 1/2008 | Yamamura ................... 358/1.15 |
| 7,386,269 B2 * | 6/2008 | Miyazaki ...................... 399/405 |
| 7,535,591 B2 * | 5/2009 | Kujirai .......................... 358/1.16 |
| 7,576,875 B2 * | 8/2009 | Momose ....................... 358/1.13 |
| 7,634,725 B2 * | 12/2009 | Nishikawa .................... 715/243 |
| 7,817,304 B2 * | 10/2010 | Sato .............................. 358/1.9 |
| 7,826,788 B2 * | 11/2010 | Ueda et al. .................... 399/410 |
| 7,916,339 B2 * | 3/2011 | Uchida ......................... 358/1.2 |
| 8,035,857 B2 * | 10/2011 | Sato .............................. 358/1.9 |
| 8,189,230 B2 * | 5/2012 | Yamaguchi ................... 358/1.18 |
| 8,411,312 B2 * | 4/2013 | Kanzawa ...................... 358/1.18 |
| 2001/0024291 A1 * | 9/2001 | Mori et al. .................... 358/1.12 |
| 2003/0189718 A1 * | 10/2003 | Yamamura ................... 358/1.13 |
| 2005/0243371 A1 | 11/2005 | Kanaya |
| 2007/0287622 A1 * | 12/2007 | Kato et al. .................... 493/424 |
| 2009/0127843 A1 * | 5/2009 | Kanzawa ........................ 281/38 |
| 2009/0273802 A1 * | 11/2009 | Kajiyama ..................... 358/1.15 |
| 2010/0080641 A1 * | 4/2010 | Iwamoto ....................... 399/408 |
| 2010/0188679 A1 * | 7/2010 | Nakagawa .................... 358/1.12 |

FOREIGN PATENT DOCUMENTS

| | | |
|---|---|---|
| JP | 08-187913 A | 7/1996 |
| JP | 2006-060317 | 3/2006 |
| WO | 2007-058390 | 5/2007 |

* cited by examiner

Primary Examiner — Dung Tran
(74) Attorney, Agent, or Firm — Canon U.S.A., Inc. IP Division (57) ABSTRACT A printing control method for printing an image onto a recording medium including inputting data to be used for printing a page, setting a position and a size of a margin for a plurality of pages represented by the input data, according to an instruction from a user, and causing a print device to print an image including the plurality of pages and in which the binding margin with the set width is arranged at the set position, onto the recording medium in a direction determined according to the width of the margin.

25 Claims, 9 Drawing Sheets

PRIOR ART

FIG. 9B

PRIOR ART

FIG. 9C

PRIOR ART

FIG. 9D

PRIOR ART

PRINTING CONTROL METHOD, PRINTING CONTROL APPARATUS, AND COMPUTER-READABLE RECORDING MEDIUM FOR SETTING A BINDING MARGIN ACCORDING TO A BINDING DIRECTION

BACKGROUND OF THE INVENTION

1. Field of the Invention

The present invention relates to a printing control method and a printing control apparatus for printing an image onto a recording medium.

2. Description of the Related Art

There has conventionally been known a method in which a layout of a print is determined in anticipation of a condition that a printed sheet is used in a folded state. For example, in a bookbinding print technique for forming a booklet, an image is laid out on the assumption that the print sheet is folded back at its center. For example, WO 2007/058390 discusses a print method in which when a print sheet, having a print image printed on one side, is folded back by a user, a printed result that appears as a pseudo two-sided print can be obtained (the print method described above is referred to as a folding two-sided print below). The print method described above is utilized for an advertising poster that is hung down from a ceiling, and that is mostly used in a mass merchandiser market and the like.

In the technique of making a layout on the assumption of the print sheet being folded back, a binding margin may sometimes be formed at the folded portion. For example, in the bookbinding technique, there has been known a technique of forming a binding margin at the folded portion, since the bookbinding has a feature that the sheet is bound at the folded portion.

On the other hand, when the hanging advertising poster is printed by using the folding two-sided print, the poster is not always hung down at the folded portion. Therefore, it is required that a binding margin is set at the portion, such as the portion for hanging the sheet, other than the folded portion. In the hanging advertising poster, a clip member, which is used as a substitute for a weight, may be set at the lower portion, which is opposite to the hanging portion. In this case, it is required that the binding margin is set at the lower portion opposite to the hanging portion.

A roll sheet is mostly used for the print sheet for forming the hanging advertising poster described above. The width of the roll sheet is fixed, but its length can freely be changed. Therefore, posters of various sizes can be formed according to the direction of a document.

Figure 9A:
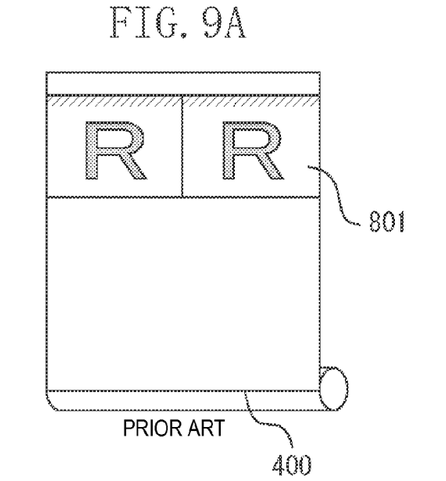
FIGS. 9A, 9B, 9C and 9D illustrate a roll sheet on which a print image having a binding margin set is printed.
Figure 9B:
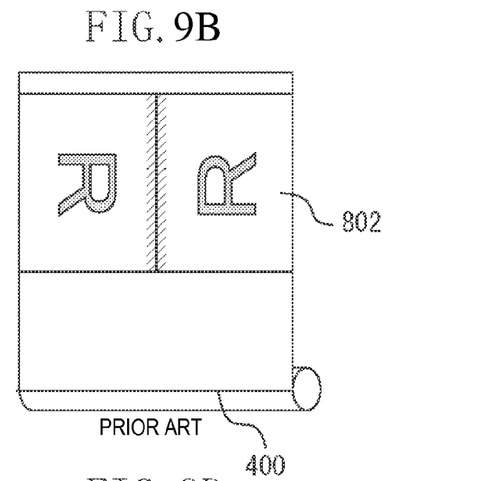
Figure 9C:
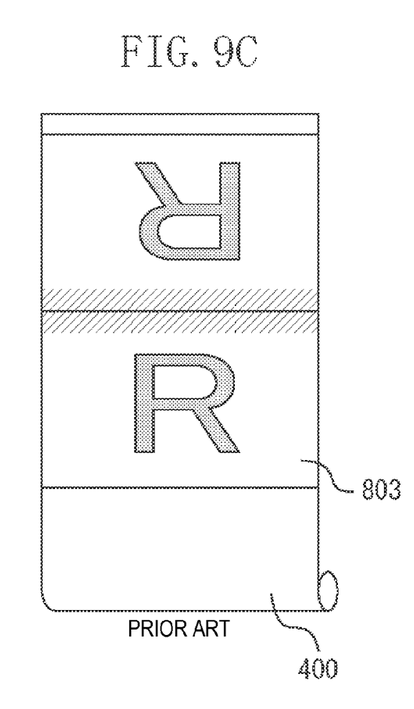
Figure 9D:
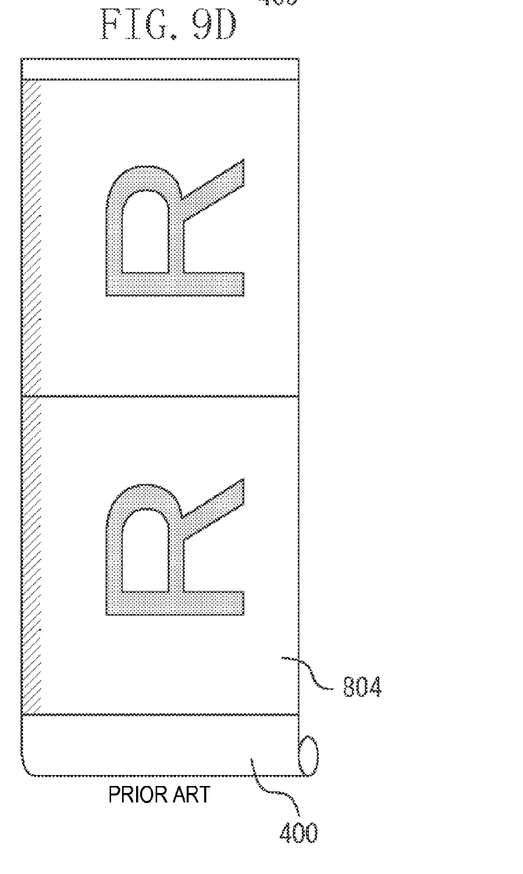

FIGS. 9A, 9B, 9C, and 9D illustrate a roll sheet on which a print image having a binding margin set thereto is printed. FIG. 9A illustrates a poster whose long side is the same as a half of the width of the roll sheet, FIG. 9B illustrates a poster whose short side is the same as a half of the width of the roll sheet, FIG. 9C illustrates a poster whose long side is equal to the width of the roll sheet, and FIG. 9D illustrates a poster whose short side is equal to the width of the roll sheet.

However, when a poster having the target size is formed, a user has to consider the direction of a document or a folded position according to the size in a conventional case, which is very troublesome. When a binding margin for the clip member used for hanging down the poster is set, a user has to consider a more complicated layout.

SUMMARY OF THE INVENTION

The present invention is directed to an image forming apparatus capable of automatically setting a binding margin according to a binding direction without a need of a complicated operation, when a print layout on the assumption of a folding is carried out.

According to an aspect of the present invention, a printing control method for printing an image onto a recording medium includes inputting data to be used for printing a page, setting a position and a size of a margin for a plurality of pages represented by the input data, according to an instruction from a user, and causing a print device to print an image including the plurality of pages and in which the margin with the set width is arranged at the set position, onto the recording medium in a direction according to the width of the margin.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
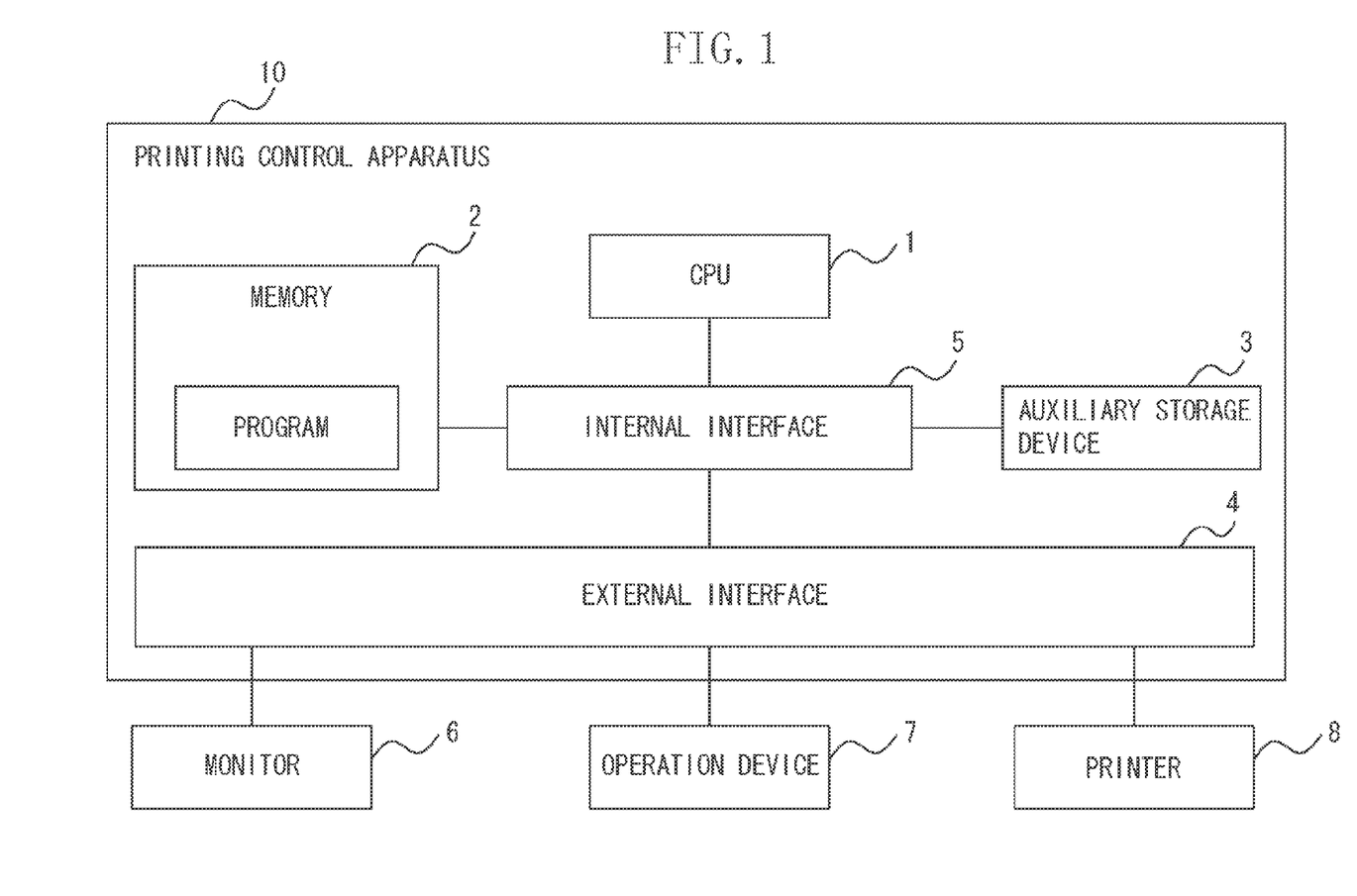
FIG. 1 is a block diagram illustrating a configuration of a printing control apparatus according to an exemplary embodiment of the present invention.

FIG. 1 is a block diagram illustrating a configuration of a printing control apparatus 10 according to the present exemplary embodiment. In the present exemplary embodiment, the printing control apparatus 10 executes a printing control method. The printing control apparatus 10 includes a central processing unit (CPU) 1, a memory 2, an auxiliary storage device 3 such as a hard disk drive, and an external interface 4, which are interconnected via an internal interface 5. The printing control apparatus 10 can also be connected to a monitor 6, an operation device 7 such as a mouse or a keyboard, and a printer 8 via the external interface 4.

The CPU 1 makes an instruction for processing to each unit, and performs various data processing, to control an entire system. The auxiliary storage device 3 has a program, which causes the CPU 1 to execute the content of the process, stored therein beforehand. The program is loaded into the memory 2 to execute the program. The CPU 1 executes the program loaded to the memory 2, thereby executing the control.

The monitor 6 is a display device such as a liquid crystal monitor and a cathode-ray tube (CRT) monitor. The CPU 1 causes the monitor 6 to display the operation guide to a user or a result of a layout of an image. When the user operates the operation device 7 such as a keyboard or a mouse, the operation content is input to the CPU 1 through the external interface 4 and the internal interface 5.

The CPU 1 can input the user's instruction through the operation device 7 to execute the control according to the operation content. The printer 8 can print an image onto a recording sheet based on the data input through the external interface.

Figure 2:
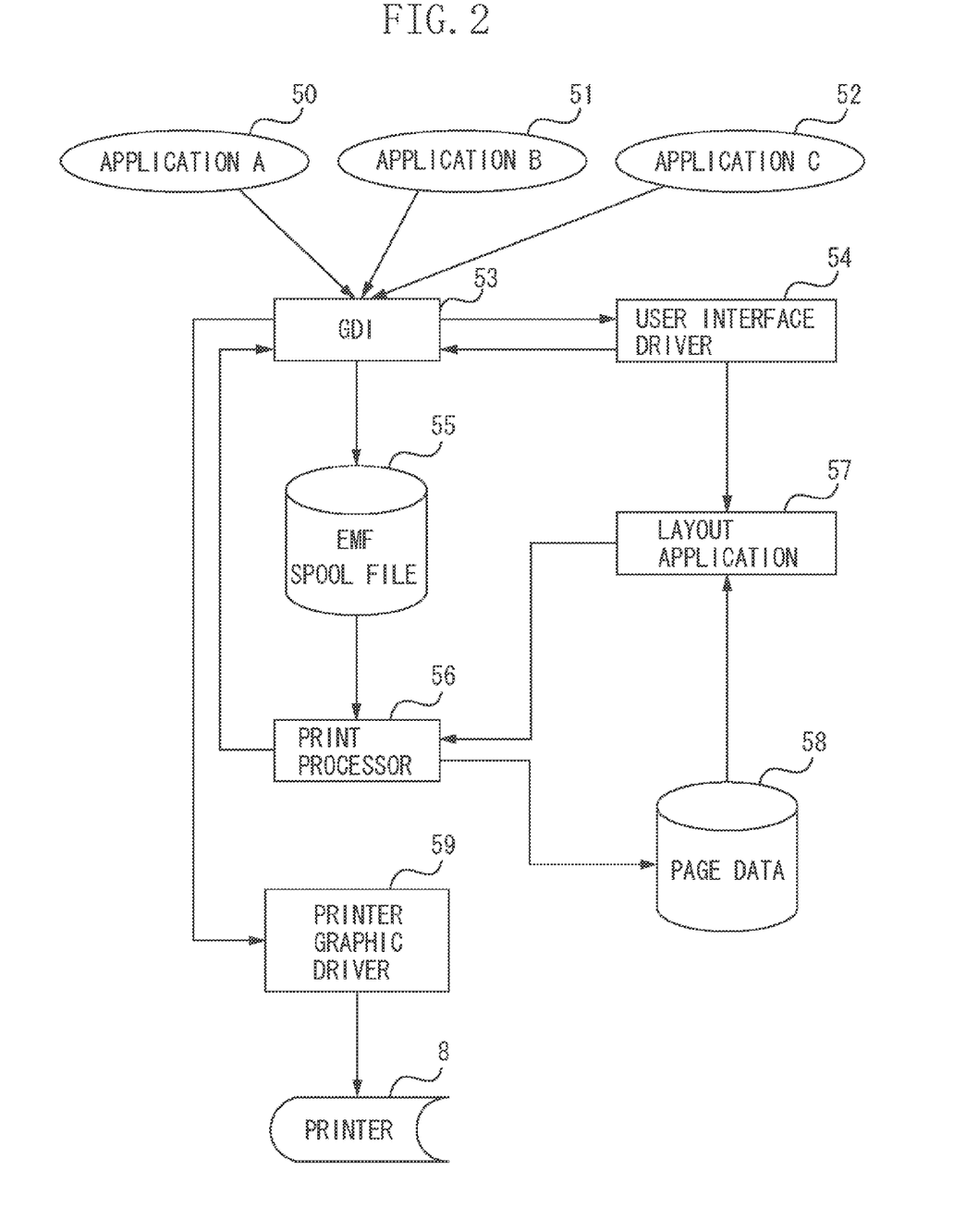
FIG. 2 illustrates a printing control in the printing control apparatus according to the exemplary embodiment of the present invention.

FIG. 2 illustrates a printing control in the printing control apparatus according to the present exemplary embodiment. Firstly, print data from a plurality of applications such as an application A50, an application B51, and an application C52, is input. The input print data is temporarily spooled as enhanced meta file (EMF) data into an EMF spool file 55. In this case, the input print data is spooled through a graphics device interface (GDI) 53.

The GDI 53 notifies the event such as a start and an end of the printing operation of a user interface driver 54 (printer driver UI). The user interface driver 54 starts a layout application 57 at the timing of the start of the printing operation.

When the spool to the EMF spool file 55 is completed, the GDI 53 notifies the completion of the spool of the user interface driver 54, and at the same time, requests the printing operation to a print processor 56. When receiving this request, the print processor 56 generates page data 58, which is the print data per a page unit, from the EMF spool file. Then, the print processor 56 deletes the EMF spool file 55, and performs a pseudo completion process for a print request is performed to the GDI 53.

Thus, the GDI 53 can accept the printing operation from the other application. In this way, the page data can be generated from the plurality of applications.

The layout application 57 performs an edition of a print layout. When the page data 58 is generated, the layout application 57 displays the page data 58 onto the application, and waits for the instruction of the print layout from a user. The layout application 57 has a function of combining the selected page data pieces. When the user's instruction is input, the layout application 57 combines two pages in a predetermined order into one set, for example. The layout application 57 also has a function of setting a binding margin. It can set a binding margin according to the user's instruction.

When the edition of the print layout according to the user's instruction is completed at the layout application 57, the printing operation is executed. In this case, the layout application 57 requests the printing operation to the print processor 56.

The print processor 56 executes again the spooled EMF data, considering the edition of the print layout for the page data 58. Then, the print processor 56 gives an instruction of the printing operation to a printer graphic driver 59 through the GDI 53. The printer graphic driver 59 converts the EMF data into a command that can be interpreted by the printer 8, and outputs the resultant.

The data to be printed is accepted from a plurality of applications, and the layout of the page based on these data pieces is determined at the layout application 57 by the system illustrated in FIG. 2. Then, an image obtained by combining the plurality of pages is printed, reflecting the layout thereon. By virtue of this process, the print image that appears as a pseudo two-sided print when it is folded back can be formed.

Incidentally, printer data for a folded two-sided print may be generated by the printer driver. However, the present embodiment can be better than the printer driver in that a plurality of applications may be designated as a print target.

Figure 3:
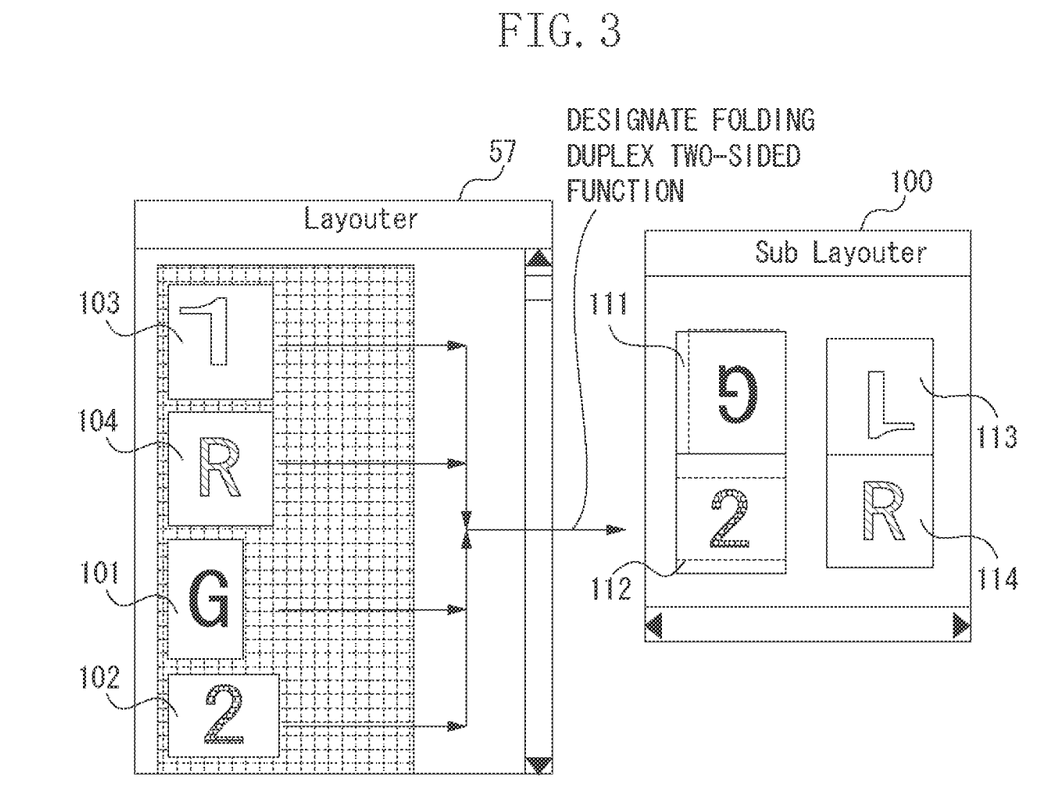
FIG. 3 illustrates an outline of a process of a layout application.

FIG. 3 illustrates an outline of a process by the layout application 57. The layout application 57 edits the print layout.

The layout application 57 accepts a plurality of page data pieces (101, 102, 103, 104) from the plurality of applications such as the application A50, the application B51, and the application C52, through the GDI 53. The layout application 57 displays thereon the accepted plurality of page data pieced as a layout.

A user selects the page data pieces in the order of 101, 102, 103, and 104 on the layout application 57, and then, designates a folding two-sided function for executing a folded two-sided print. The folding two-sided function may be designated by a user by selecting a menu (not illustrated) on the layout application 57, a tool bar icon (not illustrated), or the like.

When the folding two-sided function is designated on the layout application 57, a folding two-sided generating sub-application 100 is started. The folding two-sided generating sub-application 100 determines the layout according to the direction and size of a binding margin designated by the user. The folding two-sided generating sub-application 100 combines two pages as one set in the selected order of the selected page data pieces according to the determined layout, thereby generating a print image for the folding two-sided print.

When generating the print image for the folding two-sided print, the folding two-sided generating sub-application 100 changes the magnification in such a manner that the size of the front page and the size of the back page becomes equal to each other when the print image is folded. The folding two-sided generating sub-application 100 also rotates one of the page data pieces, which are to be combined, at 180 degrees. In the example of FIG. 3, the head page data pieces (101 and 103) are rotated by 180 degrees.

As a result of this process, the page data pieces 101, 102, 103, and 104 are combined on the folding two-sided generating sub-application 100 in such a manner that the page data pieces 111 and 112 are combined and 113 and 114 are combined to form print images as the folding two-sided print.

A binding margin is formed on the print image at that time. More specifically, the print image, which is arranged with the layout where a plurality of pages, a folding line, and the binding margin are determined, is generated. The binding margin is not only newly added to the page, but also an area for a binding margin may be formed in the page.

The print image as the folding two-sided print is generated at the folding two-sided generating sub-application 100. However, the invention is not limited thereto. The print image as the folding two-sided print can be generated on the screen of the layout application 57.

Figure 4:
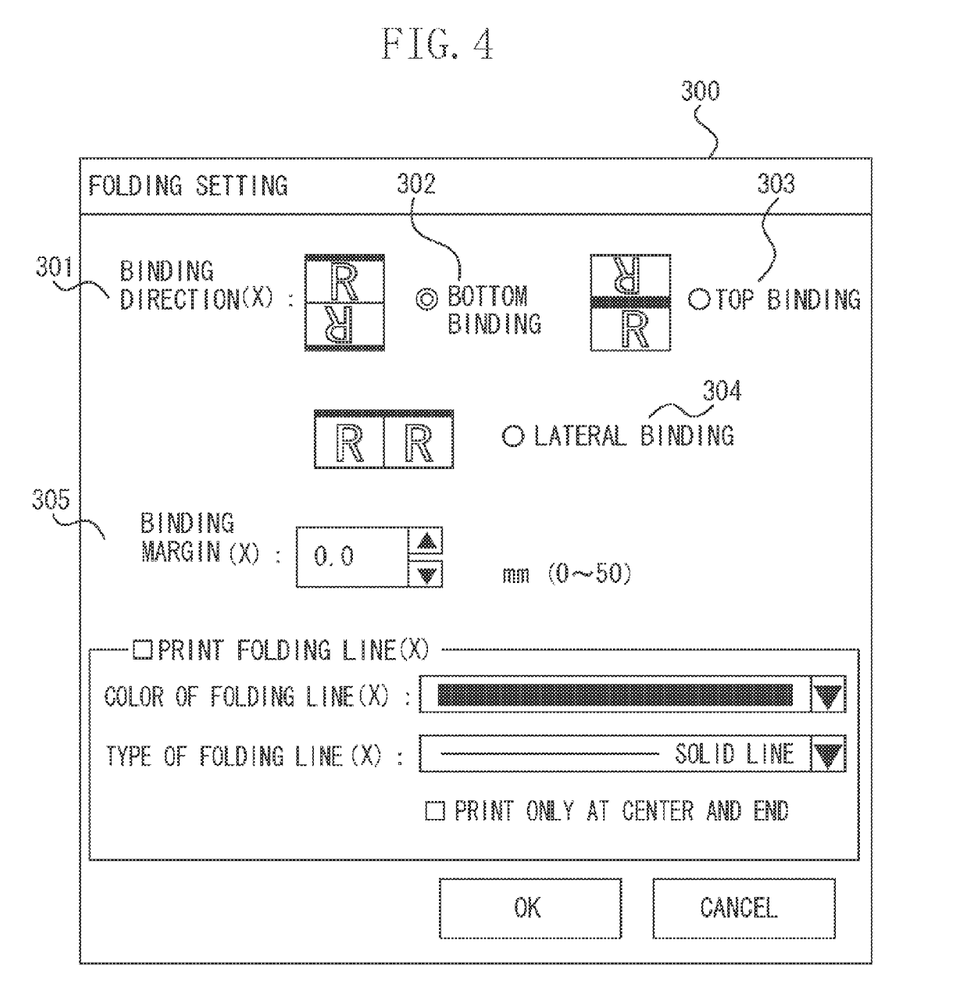
FIG. 4 illustrates one example of a folding setting in the layout application.

FIG. 4 illustrates one example of a folding setting in the layout application 57. A folding setting window 300 is started when it is designated from a menu on the layout application 57 or by a tool bar icon. The folding setting window 300 may be started through the designation on the folding two-sided generating sub-application 100.

The folding setting window 300 is provided with at least a binding direction setting 301 and a binding margin setting 305. The binding direction setting 301 can be set from among a bottom binding 302, a top binding 303, and a lateral binding 304. By the binding margin setting 305, a margin space formed as a binding margin at the position determined by the setting of the binding direction setting 301 can be set. In the example in FIG. 4, the margin space within the range of 0 mm to 50 mm can be set. When the margin space is set to be 0 mm, the binding margin is substantially not formed.

Figure 5A:
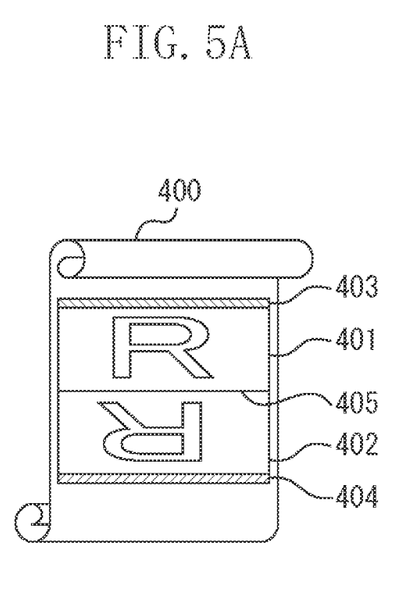
FIGS. 5A, 5B, and 5C illustrate an example of a layout in which a bottom binding is set by a binding direction setting.
Figure 5B:
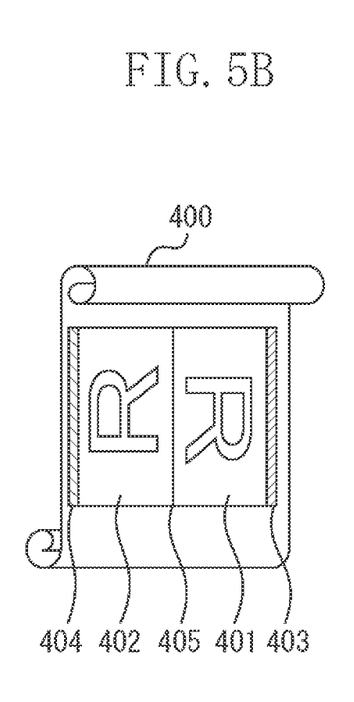
Figure 5C:
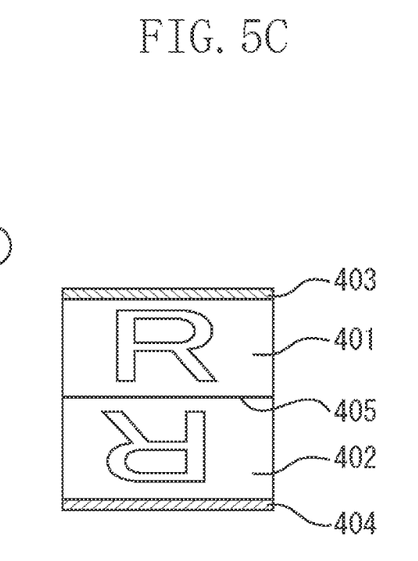

FIG. 5 is illustrates an example of the layout in which the bottom binding 302 is set by the binding direction setting 301. The bottom binding 302 is laid out for a print sheet 400 as illustrated in FIG. 5A or FIG. 5B. When the image having the layout described above is printed, a print image illustrated in FIG. 5C is formed, which becomes a pseudo two-sided print when it is folded back by a user. FIG. 5C illustrates a layout in which the print image is folded back at a folding line 405. A printed matter is obtained in which a front page 401 and a back page 402 are combined at the lower end of both pages when it is folded back by the user.

In this case, the binding margin 403 on the front page 401 and the binding margin 404 on the back page 402 need to be formed at the upper ends of the respective pages. Therefore, the binding margins 403 and 404 are formed at the position at the sheet end parallel to the folding line 405. In the print image that becomes the two-sided print when it is folded back, the pages may be reversed, regardless of which is the front page and which is the back page.

Figure 6A:
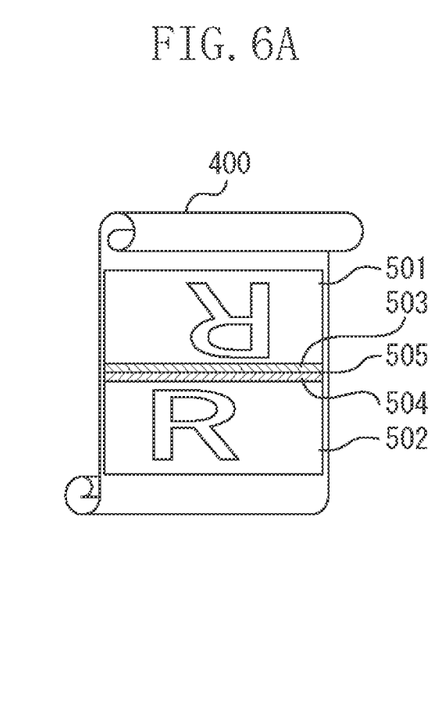
FIGS. 6A, 6B, and 6C illustrate an example of a layout in which a top binding is set by a binding direction setting.
Figure 6B:
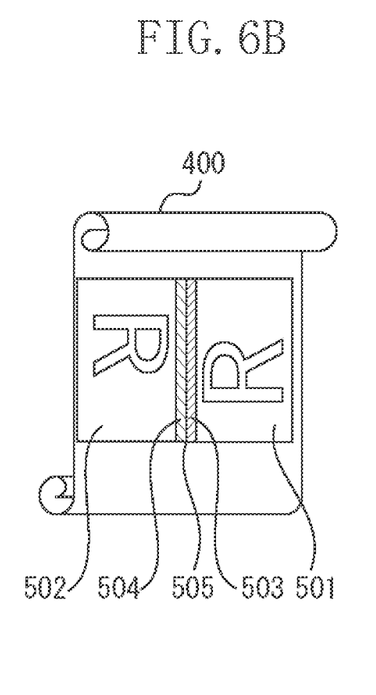
Figure 6C:
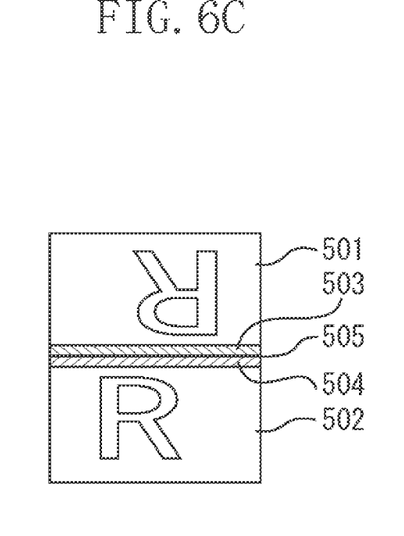

FIGS. 6A, 6B, and 6C illustrate an example of a layout in which the top binding 303 is set by the binding direction setting 301. The top binding 303 is laid out for the print sheet 400 as illustrated in FIG. 6A or FIG. 6B. When the image having the layout described above is printed, a print image illustrated in FIG. 6C is formed, which becomes a pseudo two-sided print when it is folded back by a user.

FIG. 6C illustrates the layout in which the print image is folded back at a folding line 505. A printed matter is obtained in which a front page 501 and a back page 502 are combined at the upper end of both pages when it is folded back by the user. In this case, the binding margin 503 on the front page 501 and the binding margin 504 on the back page 502 need to be formed at the upper ends of the respective pages. Therefore, the binding margins 503 and 504 are formed at the same position as the folding line 505.

In the print image that becomes the two-sided print when it is folded back, the pages may be reversed, regardless of which is the front page and which is the back page.

Figure 7A:
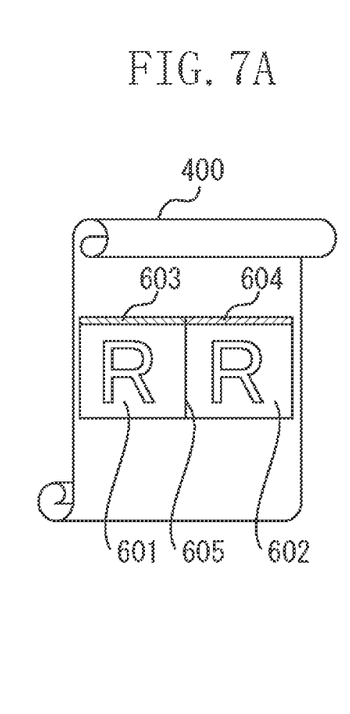
FIGS. 7A, 7B, and 7C illustrate an example of a layout in which a lateral binding is set by a binding direction setting.
Figure 7B:
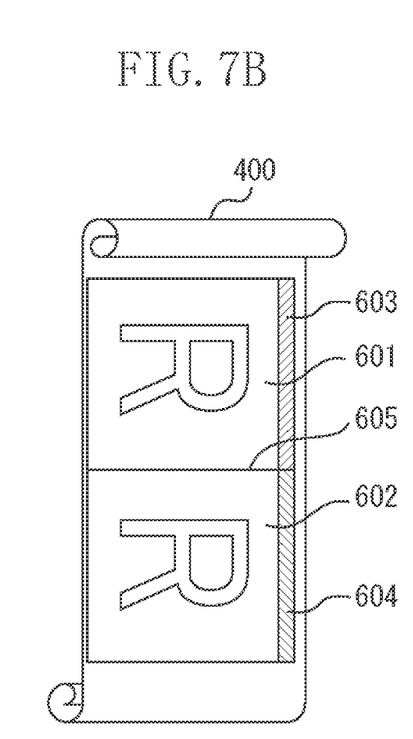
Figure 7C:
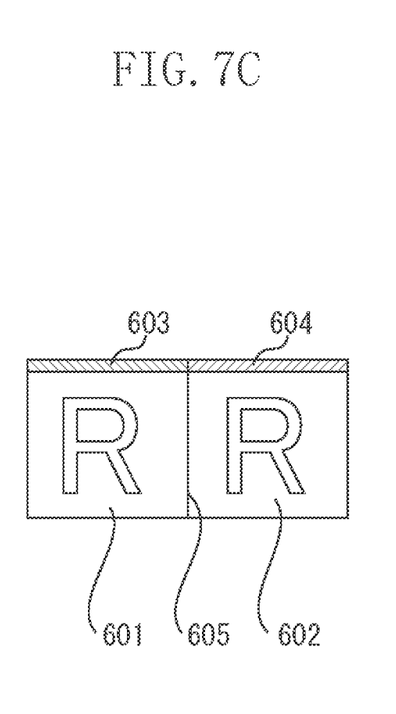

FIGS. 7A, 7B, 7C illustrate an example of the layout in which the lateral binding 304 is set by the binding direction setting 301. The lateral binding 304 is laid out for the print sheet 400 as illustrated in FIG. 7A or FIG. 7B.

When the image having the layout described above is printed, a print image illustrated in FIG. 7C is formed, which becomes a pseudo two-sided print when it is folded back by a user. FIG. 7C illustrates the layout in which the print image is folded back at a folding line 605. A printed matter is obtained in which a front page 601 and a back page 602 are combined at the right end of the front page 601 and the left end of the back page 602 at the folding line 605 when it is folded back by the user.

In this case, the binding margin 603 on the front page 601 and the binding margin 604 on the back page 602 need to be formed at the upper ends of the respective pages. Therefore, the binding margins 603 and 604 are formed at the upper end of the sheet vertical to the folding line 605. In the print image that becomes the two-sided print when it is folded back, the pages may be reversed, regardless of which is the front page and which is the back page.

As described above with reference to FIGS. 5A, 5B, 5C, 6A, 6B, 6C, 7A, 7B, and 7C, the position of the binding margin is automatically determined as in FIGS. 5C, 6C, and 7C, according to the selected binding direction by the binding direction setting 301, i.e., according to the bottom binding 302, the top binding 303, or the lateral binding 304. As illustrated in FIGS. 5A and 5B, the direction of the image to be printed to the carrying direction of the roll sheet is changed in two ways according to the size of the page. In the present exemplary embodiment, the direction of the print image to the carrying direction of the roll sheet is changed according to not only the size of the page but also the size of the binding margin.

When an image is printed on a sheet other than the roll sheet, such as the sheet having a fixed aspect ratio, as in a conventional case, the size of the image is not changed. On the other hand, in the case of the roll sheet, the size of the binding margin does not affect the printing direction, when the binding margin is formed as illustrated in FIG. 7A.

However, when the binding margin is formed as illustrated in FIG. 7B, if the binding margin is large, the binding margin does not fall within the roll sheet. Accordingly, the direction of the print image to the roll sheet is automatically changed between the direction illustrated in FIG. 4A and the direction illustrated in FIG. 4B.

Figure 8A:
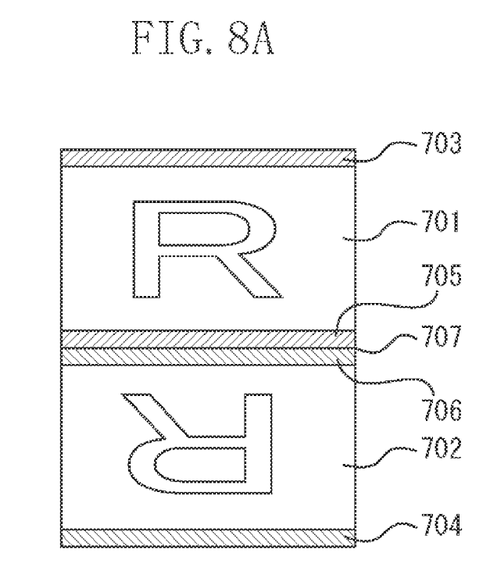
FIGS. 8A, 8B, and 8C illustrate an example of a layout in which a binding margin is formed at an upper and lower ends of a print image.
Figure 8B:
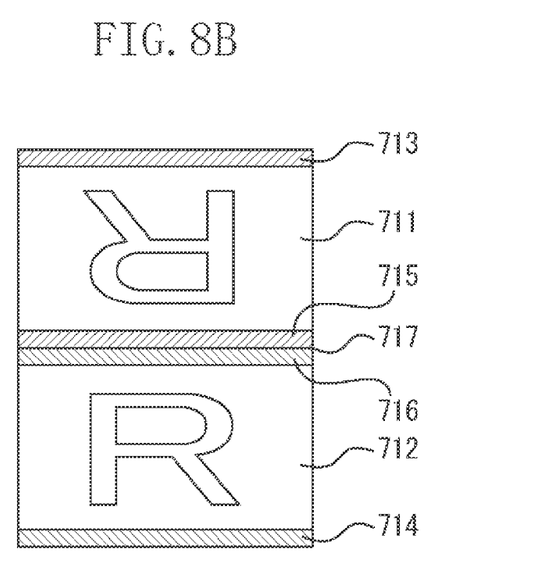
Figure 8C:
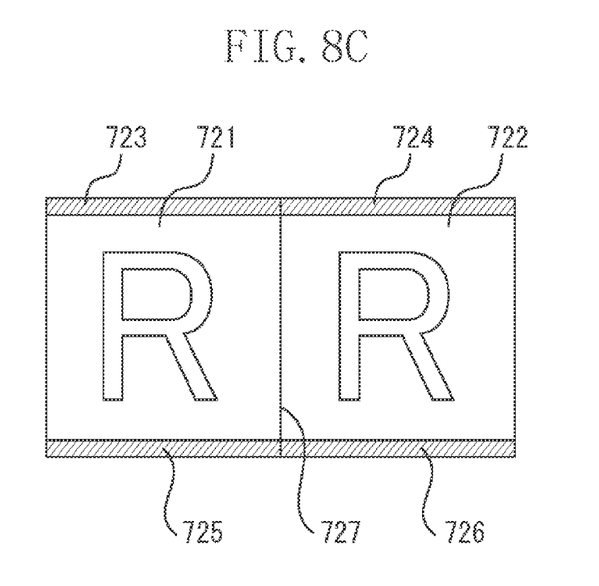

FIGS. 8A, 8B, and 8C illustrate examples of the layout in which the binding margin is formed at upper and lower ends of the print image. FIG. 8A illustrates the case in which the binding margin is formed at upper and lower ends of the print image illustrated in FIG. 5C, which is the pseudo two-sided print when the print image is folded back, and which is produced when the bottom binding 302 is set in the binding direction setting 301.

In FIG. 8A, when the print image is folded back at a folding line 707, the binding margins are formed at upper-end binding-margin positions 703 and 704, and at lower-end binding-margin positions 705 and 706.

FIG. 8B illustrates the case in which the binding margin is formed at upper and lower ends of the print image illustrated in FIG. 6C, which is the pseudo two-sided print when the print image is folded back, and which is produced when the top binding 303 is set in the binding direction setting 301. In FIG. 8B, when the print image is folded back at a folding line 717, the binding margins are formed at upper-end binding-margin positions 715 and 716, and at lower-end binding-margin positions 713 and 714.

FIG. 8C illustrates the case in which the binding margin is formed at upper and lower ends of the print image illustrated in FIG. 7C, which is the pseudo two-sided print when the print image is folded back, and which is produced when the lateral binding 304 is set in the binding direction setting 301. In FIG. 8C, when the print image is folded back at a folding line 727, the binding margins are formed at upper-end binding-margin positions 723 and 724, and at lower-end binding-margin positions 725 and 726. The binding margin at the upper end is utilized for hanging down the print image, while the binding margin at the lower end is utilized for a clip member, which is used for stabilizing the condition of the print image that is hung down.

In the present exemplary embodiment, only one binding margin setting 305 is provided on the folding setting window 300. However, the setting items including the item for the upper-end binding margin and the item for the lower-end binding margin may be provided to set the upper-end and the lower-end binding margins with the independent size respectively.

In this case, if 0 mm is set for the item for the upper-end binding margin and the item for the lower-end binding margin respectively, the binding margins are not formed at both ends.

Alternatively, the setting item (not illustrated) for designating whether the binding margin is set at the lower end may be provided, and thereby the changeover between the print images in FIG. 8A and FIG. 5C, between the print images in FIG. 8B and FIG. 6C, and between the print images in FIG. 8C and FIG. 7C may be performed.

The exemplary embodiment described above illustrates the printing control for the print device in the printing control apparatus. However, the present invention is not limited thereto. A system including a plurality of devices may execute the printing control. In the above description, the roll sheet is used as an example of the recording sheet. However, the present invention is not limited thereto. The present invention is applicable to the case in which a printing operation is executed for a cut sheet.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-082084 filed Mar. 30, 2009, which is hereby incorporated by reference herein in its entirety.

What is claimed is:

1. A method performed by at least one processor comprising:
    inputting data to be used for printing a page;
    designating a folding pattern of folding of a recording medium on which a plurality of pages corresponding to the input data are printed, according to an instruction by a user;
    setting, in a margin setting, whether or not a margin is added to each of the plurality of pages, according to an instruction by the user; and
    causing a print device to print a print image in which each of the plurality of pages is arranged with a page direction corresponding to the designated folding pattern, onto the recording medium,
    wherein, in a case where a predetermined folding pattern is designated and a setting of adding the margin corresponding to the margin setting is executed in the setting, the print image in which a top-bottom direction of a first page becomes opposite to a top-bottom direction of a second page and the margin is added on a top side of each of the first page and the second page, is printed.

2. The method according to claim 1, wherein data used for printing the respective pages is input from a plurality of applications to print the print image including the plurality of pages corresponding to the plurality of applications.

3. The method according to claim 1, further comprising:
    changing a magnification of at least one of the plurality of pages according to another page of the plurality of pages, and
    causing the print device to print the print image in which the magnification of the at least one of the plurality of pages is changed.

4. The method according to claim 3, wherein the magnification of at least one page is changed so that sizes of the plurality of pages in the print image become identical.

5. The method according to claim 1, wherein the image is printed in the direction according to a size of the margin and a size of each of the plurality of pages.

6. A non-transitory computer-readable recording medium having recorded thereon a program for allowing a computer to execute the method according to claim 1.

7. The method according to claim 1, further comprising
    displaying, by a display device, a plurality of folding patterns;
    wherein the folding pattern is designated from the plurality of displayed folding patterns according to an instruction by a user.

8. The method according to claim 1, wherein the print image is printed onto a continuous sheet by the print device.

9. The method according to claim 1, wherein the print image further includes information indicating a folding line, and the print image including the information is printed onto the recording medium by the print device.

10. The method according to claim 1, wherein in the margin setting, a margin size is set, and in a case where the margin size is set to 0, the setting of not adding the margin is executed in the setting, and in a case where the margin size larger than 0 is set, the setting of adding the margin is executed in the setting.

11. The method according to claim 1, wherein, in a case where a first folding pattern is designated as the predetermined folding pattern, each of the first page and the second page is arranged so as to be folded on a bottom side of each of the two pages, and the margin is added to each of the first page and the second page so that the margin is added on the top side of each of the first page and the second page.

12. The method according to claim 1, wherein in a case where a second folding pattern is designated as the predetermined folding pattern, each of first page and the second page is arranged so as to be folded on the top side of each of the two pages, and the margin is added to each of the first page and the second page so that the margin is added on the top side of each of the first page and the second page.

13. The method according to claim 1, wherein in a case where a different folding pattern different from the predetermined folding pattern is designated, each of the first page and the second page is arranged in the print image, so that in the print image, a top-bottom direction of the first page coincides with a top-bottom direction of the second page.

14. The method according to claim 13, wherein the margin is added to each of the first page and the second page, so that in the print image, the margin is added on each top side of the first page and the second page.

15. The method according to claim 1,
    wherein in a case where the predetermined folding pattern is designated and a setting of not adding the margin corresponding to the margin setting is executed in the setting, the print image in which each of the first page and the second page of a predetermined size is arranged and the margin is not added to each of the first page and the second page, is printed,
    and wherein, in a case where the predetermined folding pattern is designated and a setting of adding the margin is executed in the setting, the print image in which each of the first page and the second page of the predetermined size is arranged and the margin is newly added on the top side of each of the first page and the second page of the predetermined size, is printed.

16. An apparatus for printing an image onto a recording medium comprising:
- an input unit configured to input data to be used for printing a page;
- a designating unit configured to designate a folding pattern of folding of a recording medium on which a plurality of pages corresponding to the input data are printed, according to an instruction by a user;
- a setting unit configured to set, in a margin setting, whether or not a margin is added to each of the plurality of pages, according to an instruction by the user; and
- a printing control unit configured to cause a print device to print a print image in which each of the plurality of pages is arranged with a page direction corresponding to the designated folding pattern, onto the recording medium,
- wherein, in a case where a predetermined folding pattern is designated and a setting of adding the margin corresponding to the margin setting is executed in the setting, the print image in which a top-bottom direction of a first page becomes opposite to a top-bottom direction of a second page and the margin is added on a top side of each of the first page and the second page is printed.

17. The apparatus according to claim 16, wherein the input unit inputs data used for printing the respective pages from a plurality of applications, to print the print image including the plurality of pages corresponding to the plurality of applications.

18. The apparatus according to claim 16, further comprising:
- a changing unit configure to change a magnification of at least one of the plurality of pages according to another page of the plurality of pages;
- wherein the printing control unit causes the print device to print the print image in which the magnification of the at least one of the plurality of pages is changed by the changing unit.

19. The apparatus according to claim 18, wherein the magnification of at least one page is changed so that sizes of the plurality of pages in the print image become identical.

20. The apparatus according to claim 16, wherein the printing control unit causes the print device to print the print image in the direction according to a size of the margin and a size of each of the plurality of pages.

21. The apparatus according to claim 16, further comprising a display control unit configured to cause a display device to display a plurality of folding patterns,
- wherein the folding pattern is designated from the plurality of folding patterns according to an instruction by a user based on the plurality of folding patterns displayed by the display control unit.

22. The apparatus according to claim 16, wherein the print image is printed onto a continuous sheet by the print device.

23. The apparatus according to claim 16, wherein the print image further includes information indicating a folding line, and the print image including the information is printed onto the recording medium by the print device.

24. The apparatus according to claim 16, wherein, in a case where a first folding pattern is designated as the predetermined folding pattern, each of the two pages the first page and the second page is arranged so as to be folded on a bottom side of each of the two pages, and the margin is newly added to each of the first page and the second page the two pages so that the margin is added on a the top side of each of the two pages first page and the second page.

25. The apparatus according to claim 16, wherein in a case where a second folding pattern is designated as the predetermined folding pattern, each of the two pages first page and the second page is arranged so as to be folded on the a top side of each of the two pages, and the margin is newly added to each of the first page and the second page the two pages so that the margin is added on the top side of each of the first page and the second page the two pages.

* * * * *